N. M. BAKER.
GUARD.
APPLICATION FILED MAY 3, 1912.
1,093,678.
Patented Apr. 21, 1914.
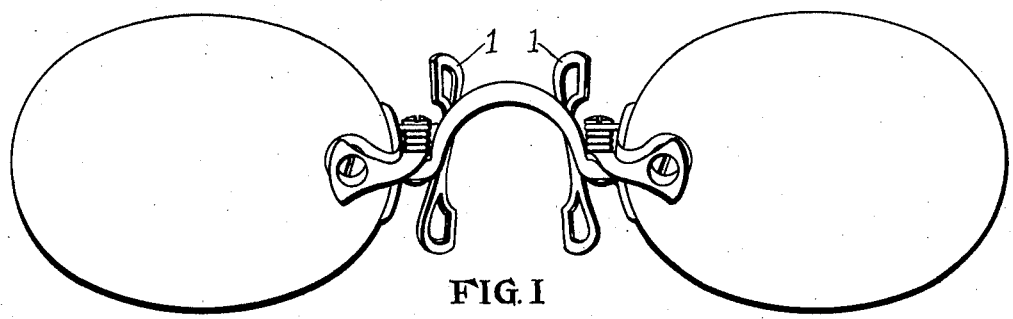
FIG. I
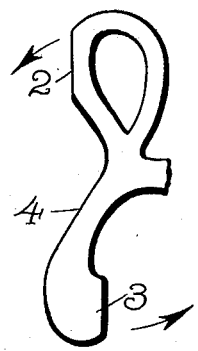
FIG. II
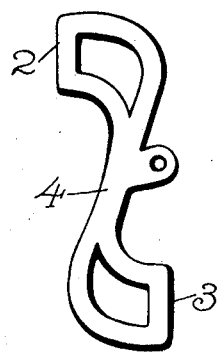
FIG. III
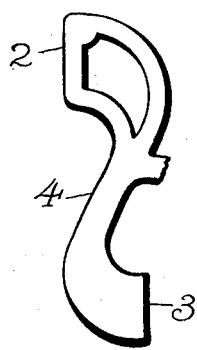
FIG. IV
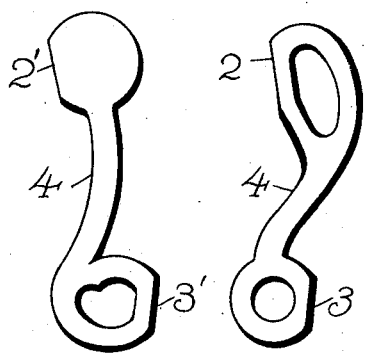
FIG. V    FIG. VI
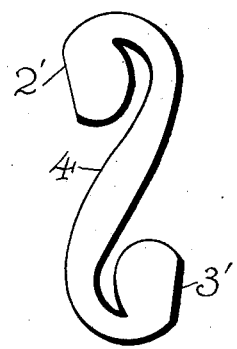
FIG. VII
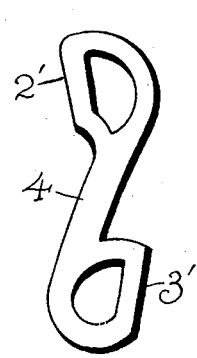
FIG. VIII
WITNESSES:
Joseph J. Demers
Reginald H. Waters
INVENTOR
NELSON M. BAKER
By H. H. Styll  H. K. Parsons.
ATTORNEYS

UNITED STATES PATENT OFFICE.

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

GUARD.

1,093,678. Specification of Letters Patent. Patented Apr. 21, 1914.

Application filed May 3, 1912. Serial No. 694,866.

*To all whom it may concern:*

Be it known that I, NELSON M. BAKER, a citizen of the United States, residing at Southbridge, in the county of Worcester and State of Massachusetts, have invented certain new and useful Improvements in Guards, of which the following is a specification.

My invention relates to improvements in eyeglass guards and has particular reference to an improved form of guard for use in those mountings in which a guard is caused by spring pressure to engage the nose and retain the glasses thereon.

The leading object of my invention is the provision of an improved form of guard which shall be so constructed as to securely engage the nose to prevent both slipping of the guard thereon and more especially to prevent tilting of the guard and mounting.

Figure I represents a front view of a pair of eyeglasses equipped with one form of my improved guard. Fig. II represents a plan view of one form of my improved guard. Fig. III represents a plan view of another form thereof. Fig. IV represents a plan view of another shape embodying the generic feature of my invention. Fig. V represents a plan view of another shape of guard illustrating a slightly different modification of my invention. Fig. VI represents a plan view of another shape of guard embodying the said modification. Fig. VII represents a view of an S guard embodying the modification of my improvement. Fig. VIII represents a view of another shape of guard embodying my improvement.

In the fitting of eyeglasses and more especially in the wearing thereof great difficulty is usually experienced in attaining such an adjustment of the guard and in securing a guard of such peculiar shape that it will satisfactorily cling to the nose and also will prevent tilting of the glasses. Ordinarily eyeglasses fall from the nose of the wearer on account of tilting of the mounting due to the weight of the upper portion of the lenses being disposed forwardly of the center of gravity. In my present invention I have provided guards which overcome this defect so far as it is possible to provide a spring actuated guard which will obviate this defect present in practically all guards in common use.

As eyeglasses tilt to fall off of the nose they to a large extent swing on the bridge or lens clips as a center of pivotance and consequently the guard moves substantially as is indicated by the arrows in Fig. II. Consequently to prevent this tilting movement it is necessary to provide some particular resistance against movement in this direction in addition to so forming the guard as to satisfactorily engage the nose to prevent the slipping of the entire guard and mounting. To attain this result I have formed those forms of my guard 1 shown in Figs. II, III and IV with the sharp straight edge 2 at the front upper portion thereof and with a similar edge 3 at the lower rear portion thereof. It will thus be seen that as the guard tends to shift in the direction indicated by the arrows the edge 2 will bite into the flesh at the upper portion of the nose and will resist forward movement of the top of the guard while at the same time the edge 3 will bite into the flesh at the lower part of the nose and prevent rearward movement of the lower end of the guard, the guard being thus almost locked against tilting movement, whereby its clinging efficiency is very greatly increased.

In those forms of my invention shown in Figs. V, VI, VII and VIII, I have further slightly modified the guard in that in place of having the substantially vertical portions 2 and 3 I have the portions 2' and 3', the edge 2' inclining downwardly and inwardly while the portion 3' inclines upwardly and outwardly relative to the guard. The further advantage of this form of my invention will be at once apparent to all those familiar with the fitting or wearing of eyeglasses. It is to be noted that eyeglass guards do not rest in a vertical position but are always disposed at an angle from the vertical in order that they may correctly fit against the sides of the nose of the wearer. When in this position, particularly on noses with a decided flare from the bridge, the straight edges 2 and 3 as shown have a tendency to engage only at the outer corners after the glasses have slightly slipped and, therefore, do not attain entire efficiency in preventing tilting of the glasses. The forms shown in Figs. V to VIII inclusive obviate any objection of this character, however, in that as the guards start to tilt the angle of the edge 2' causes the entire edge to bite into the flesh over the bridge of the nose while likewise the angle of inclination of the portion 3' at the lower end of the guard so corresponds to the flaring shape of the bony part of the nose that the entire edge 3' will bite into the flesh over said bony part and will thus resist rearward movement of the lower portion of the guard.

By reference to the drawings it will be observed that in all of the forms of my guard illustrated the upper portion of the guard having the edge 2 or 2' and the lower portion thereof having the edge 3 or 3' are connected by a reduced portion 4 which is formed of pliable material. This reduced portion 4 thus permits of bending and relative twisting of the upper and lower portions of the guard so that the guard may readily be adapted to the contour of the nose of the individual wearer and also so that the edges 2 and 3 or 2' and 3' may be adjusted with respect to each other so that both of the edges will bite in correctly to prevent tilting of the nose.

From the foregoing description taken in connection with the accompanying drawings the construction of my improved eyeglass guard will be readily apparent, and it will be seen that I have provided a thoroughly practical and efficient guard which will satisfactorily prevent tilting of the guard and thus of the mounting and will thus command itself to all as a highly desirable and efficient construction.

I claim:

1. A guard comprising an upper outwardly offset bearing portion with a straight front edge, a lower inwardly offset bearing portion with a straight rear edge, and a stem connecting the bearing portions adapted to incline the straight edges toward the nose when given a torsional twist.

2. A nose guard comprising upper and lower offset bearing portions having straight front and rear edges respectively and disposed on opposite sides of a connecting stem adapted to incline the straight edges toward the nose when given a torsional twist.

3. A nose guard comprising an upper outwardly offset bearing portion having a downwardly and inwardly inclined straight front edge, a lower inwardly offset bearing portion having an upwardly and outwardly inclined rear edge and a stem connecting the bearing portions adapted to incline the straight edges toward the nose when twisted torsionally.

4. A nose guard comprising a stem, a straight edged upper bearing portion outwardly offset from the stem, a straight edged lower bearing portion inwardly offset from the stem, said straight edges being relatively short, terminally disposed and cut back from a sharp corner to the stem and adapted to be turned toward the nose by twisting the stem.

In testimony whereof I affix my signature in presence of two witnesses.

NELSON M. BAKER.

Witnesses:
ALICE M. HOAR,
JOSEPH J. DEMEN.

---

Copies of this patent may be obtained for five cents each, by addressing the "Commissioner of Patents, Washington, D. C."